Figure 1:
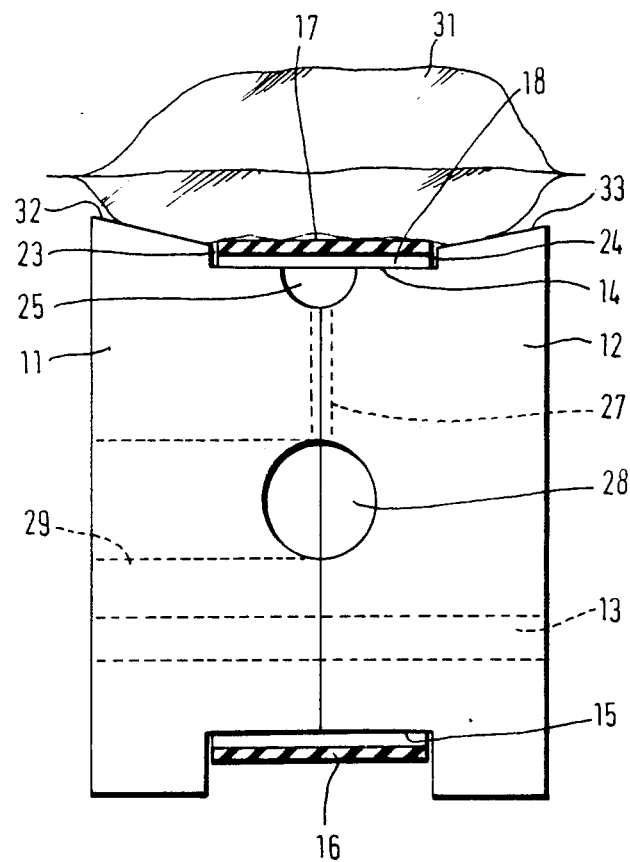

United States Patent [19]

Franklin

[11] Patent Number: 4,555,013
[45] Date of Patent: Nov. 26, 1985

[54] CONVEYOR BELT HAVING VACUUM SYSTEM FOR RETAINING ARTICLES THEREON

[75] Inventor: Kenneth W. Franklin, Knightcote, England

[73] Assignee: Bishopbarn Limited, Leamington Spa, England

[21] Appl. No.: 540,409

[22] Filed: Oct. 11, 1983

[30] Foreign Application Priority Data

Oct. 28, 1982 [GB] United Kingdom ............... 8230777

[51] Int. Cl.⁴ .......................................... D65G 17/46
[52] U.S. Cl. ................................. 198/689.1; 198/841; 271/197
[58] Field of Search ............... 198/689, 841, 837, 735, 198/811, 725; 271/197, 276, 196

[56] References Cited

U.S. PATENT DOCUMENTS

| | | | |
|---|---|---|---|
| 3,198,319 | 8/1965 | Blume | 198/725 |
| 3,288,037 | 11/1966 | Burnett | 271/197 X |
| 3,381,800 | 5/1968 | Everett et al. | 198/735 |
| 3,389,908 | 6/1968 | Martin | 271/197 |
| 3,722,665 | 3/1973 | Probasco | 198/689 |
| 3,768,624 | 10/1973 | Kornylak | 198/735 X |
| 3,881,594 | 5/1975 | Jepsen | 198/841 X |
| 3,885,837 | 5/1975 | Mellor | 198/841 X |
| 3,889,801 | 6/1975 | Boyer | 198/811 X |

FOREIGN PATENT DOCUMENTS

| | | | |
|---|---|---|---|
| 56-136713 | 10/1981 | Japan | 271/276 |
| 906209 | 9/1962 | United Kingdom | 271/197 |
| 1241239 | 8/1971 | United Kingdom | 271/197 |

Primary Examiner—Robert J. Spar
Assistant Examiner—Jonathan D. Holmes
Attorney, Agent, or Firm—Kemon & Estabrook

[57] ABSTRACT

A conveyor comprising an endless belt for conveying items forward with a vacuum system for vacuum gripping items to the belt to avoid shifting of the items relative to the belt.

5 Claims, 2 Drawing Figures

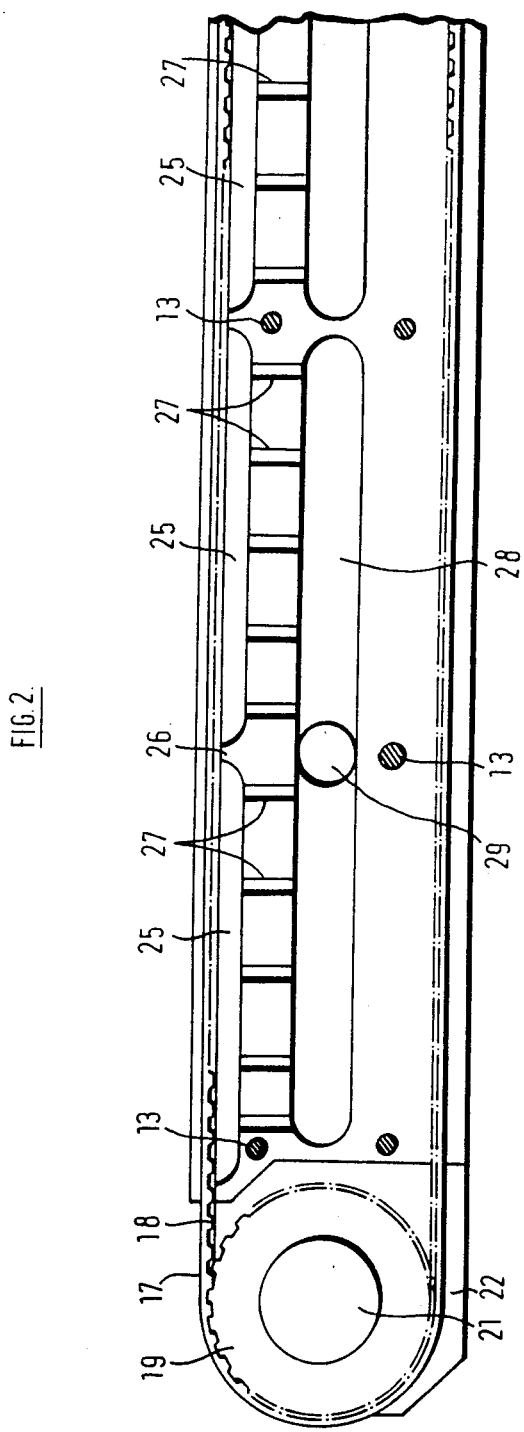

CONVEYOR BELT HAVING VACUUM SYSTEM FOR RETAINING ARTICLES THEREON

The invention relates to conveyors. The invention is concerned particularly but not exclusively with the transportation of items having a dimension of a few centimeters and a mass of between a few grammes and perhaps five hundred or one thousand grammes. The invention is also concerned particularly but not exclusively with situations where progress of a conveyor and an item on the conveyor is intermittent and the distance travelled by the item is controlled accurately, for example to position the item accurately for packaging purposes. Such intermittent movement through a specific distance is normally known as indexing.

The most convenient form of conveyor for many purposes is a flexible belt conveyor. This kind of conveyor is not normally suitable for indexing because during starting and stopping movements, slip can occur between the belt and its drive and between the belt and an item carried on the belt. Thus, where indexing is required, it is normally necessary to go to the expense of providing a positive connection between the conveyor and an item carried by the conveyor, for example slats on the conveyor.

An object of the present invention is to provide a conveyor which is particularly useful for causing an item conveyed to move accurately with the conveyor. This makes the conveyor suitable for indexing purposes or conveying items along an incline.

In accordance with the present invention there is provided a conveyor comprising a belt which runs in a guide and has a conveying face and a reverse face, a chamber on the reverse side of the belt coupled to a source of partial vacuum and gaps between the edges of the belt and its guide through which air can be drawn into the chamber in order to tend to hold an item to be conveyed against the conveying face of the belt.

Preferably the reverse face of the belt incorporates transverse teeth by means of which it can be driven by a correspondingly toothed drive pulley so that the belt can be indexed accurately through a predetermined distance by a corresponding indexing of the drive pulley.

Preferably the teeth have flat crests to provide a convenient bearing surface for the belt in its guide.

Preferably the guide for the toothed belt has a flat face over which the projecting teeth of the belt run and an opening in said face remote from the edges of the belt for connection to the source of partial vacuum, the gaps between the teeth providing transverse passages for air flow from the edges of the belt to said opening.

Preferably the guide comprises a groove which is slightly wider than the belt to allow air flow around the edges of the belt and is less deep than the belt so that the edges of the conveying surface project above the groove and tend to grip an item being conveyed when the item is drawn against the belt by air flow.

In order to provide extra grip between the belt and an item, the belt may be provided with apertures remote from its edge through which air can be drawn to draw an item against the conveying face.

An embodiment of the invention will now be described with reference to the accompanying drawings in which:

FIG. 1 is a diagrammatic cross-section through a conveyor also showing an item being conveyed; and FIG. 2 is a diagrammatic longitudinal section of the conveyor.

The conveyor illustrated in the drawings is intended primarily for transporting individual packets of snack foods such as potato crisps from a bag filling station to a station for packing the individual bags into cartons. In order to pack the carton correctly it is necessary to position several individual bags side by side with a high degree of accuracy to form a layer for subsequent transfer to the carton. This requires an indexing function for the conveyor to ensure that the packets arrive at the correct position. Although the conveyor is intended primarily to be a major constituent part of a packaging machine, the invention is concerned particularly with the conveyor itself so the detailed description will be restricted to the conveyor.

The main conveyor body is made up of two longitudinally extending aluminium members 11 and 12 which are joined together by a series of locating dowels and similar fixings 13. These two members together form a generally rectangular conveyor body with an upper groove 14 and a lower groove 15 in which a belt 16 can run. The belt 16 is a conventional toothed flexible driving belt and has a flat conveying face 17. The reverse face of the belt carries transverse ribs or teeth 18. FIG. 2 shows a conventional toothed driving pulley 19 for the belt 16. Pulley 19 is mounted in a bearing 21 carried between extensions 22 of the conveyor body and is driven by a controlled indexing motor (not shown). A second pulley, in this case an idling pulley, is provided at the opposite end of the conveyor which is not shown in the drawings.

The upper groove 14 for belt 16 is slightly wider than the belt, resulting in gaps 23 and 24 between the edges of the belt and the edges of the groove. Near the centre of the groove a longitudinally extending trough 25 constitutes a vacuum chamber. As seen in FIG. 2, there are in practice several such troughs, divided by walls 26. Troughs 25 are connected through drillings 27 to plenum chambers 28 in the central part of the conveyor body. Transverse connections 29 connect the plenum chambers to a source of vacuum such as a suction fan (not shown). When the suction fan is operated, it draws air out of the plenum chamber and thus also draws air down through the drillings 27 from the vacuum troughs 25. The transverse grooves between adjacent teeth on the reverse face of the belt provide channels through which air is drawn from the gaps 23 and 24 at the edges of the belt. This flow of air tends to suck down an item such as a packet of crisps 31 so that it engages firmly with the belt 16, particularly around the outer edges of the conveying face of the belt. Because the belt has a rubber or rubber-like surface, the item 31 grips the belt firmly so that when the belt moves in its groove, the item moves with the belt through a distance corresponding accurately to the movement of the belt. Even if the belt accelerates and stops rapidly, accurate indexing of the item can be achieved.

The upper face of the conveyor body is inclined down at a slight angle to help to hold items on the conveyor even when the suction fan is switched off. The inclined faces 32 and 33 of the conveyor body are of polished aluminium so that the item 31 slides smoothly along these inclined faces.

The arrangement of individual plenum chambers and of individual vacuum troughs allows the degree of vacuum to be varied along the length of the conveyor. A higher degree of vacuum than normal may be necessary over an inclined section of a conveyor either for lifting items or for lowering them at a controlled rate. It may also be desirable to reduce the level of vacuum at an area where the items are to be removed from the conveyor. It may even be possible, with light items and a high degree of suction to convey the items along the underside of a conveyor. For example, for discharge purposes it may be desirable to run an item along the length of the upper surface of a conveyor, run it round a pulley at the end of a conveyor whilst maintaining suction to hold the item in position and then to provide an area without suction on the underside of the conveyor close to the pulley so that the items fall from the conveyor in an orderly manner when they reach this position.

The primary intended purpose of the conveyor is to transport packets weighing of the order of thirty to fifty grammes and of such a size as to overlap the edges of a belt which is approximately four centimeters wide. However, experience has shown that in the configuration shown in the drawings, packs weighing up to five hundred grammes can be transported. It is envisaged that in some circumstances even heavier items could be handled by the system.

It may be desirable, particularly with heavier items or on an incline or for conveying on the underside of a conveyor to provide holes within the surface of the belt so as to generate further suction in addition to that created around the edges of the belt.

What is claimed is:

1. A conveyor comprising an endless belt, means mounting the belt for travel of the belt in an endless path including an upper generally horizontally extending reach in which the belt travels in a forward direction for conveying forward items on the belt, and means for drawing a vacuum along said reach for vacuum gripping the items to the belt to avoid shifting of the items relative to the belt, said belt having transverse teeth on its underside, the belt mounting means has a groove through which said reach of the belt travels, the groove being wider than the belt and the belt travelling through the groove with gaps between its side edges and the sides of the groove, and said vacuum means comprising means for drawing a vacuum in the groove to draw a vacuum through the gaps via the spaces between the teeth of the belt for vacuum gripping the items to the upper face of said reach of the belt.

2. A conveyor as set forth in claim 1 wherein said belt mounting means has inclined faces at opposite sides of the groove inclined down toward the groove.

3. A conveyor as set forth in claim 2 wherein said faces are polished so that items vacuum-gripped to said reach of the belt may slide smoothly along said faces.

4. A conveyor comprising a belt having a conveying face and a reverse face having transverse teeth thereon, a guide in which the belt runs, said guide including a flat face over which the projecting teeth of the belt run and a longitudinally extending opening in said face remote from the edges of the belt forming a chamber, a source of partial vacuum communicating with said chamber, and gaps between the edges of the belt and its guide, the spaces between the teeth providing transverse passages for air flow from the edges of the belt to said opening through which air can be drawn into the chamber in order to tend to hold an item to be conveyed against the conveying face of the belt.

5. A conveyor as set forth in claim 4 wherein said conveyor further includes a correspondingly toothed drive pulley by means of which the belt can be driven.

* * * * *